United States Patent

[11] 3,601,093

| [72] | Inventor | Floraine Cohen |
| | | 9838 57th Ave., Lefrak City, Queens, N.Y. |
| [21] | Appl. No. | 853,258 |
| [22] | Filed | Aug. 27, 1969 |
| [45] | Patented | Aug. 24, 1971 |

[54] PET ACCESSORY FOR ATTACHEMENT TO A COMMODE
8 Claims, 5 Drawing Figs.

| [52] | U.S. Cl. | 119/1 |
| [51] | Int. Cl. | A01k 29/00 |
| [50] | Field of Search | 119/1; 4/1, 10 |

[56] References Cited
UNITED STATES PATENTS

| 2,053,594 | 9/1936 | Albert | 119/1 |
| 2,528,404 | 10/1950 | Wetzel, Sr. | 119/1 X |
| 2,584,656 | 2/1952 | Anderson | 119/1 |
| 2,883,963 | 4/1959 | Scott | 119/1 |
| 3,386,417 | 6/1968 | Machowski | 119/1 |

Primary Examiner—Hugh R. Chamblee
Attorney—Roberts & Cohen

ABSTRACT: A pet accessory for attachment to a commode is provided which rests atop a conventional commode and is held thereon by hooks which prevent horizontal displacement. The accessory includes an oval support having a center opening disposed above the commode, there being a trap door arrangement which can be controllably operated for purposes of discharging waste material. The oval support is provided with an interior channel having radially disposed ports opening inwardly towards the trap door arrangement. Additionally, there is provided a collapsible and detachable cage which can be mounted on the support to hold the pet therein. A hose arrangement is provided for connection with the aforesaid interior channel and in the hose is arranged a dispenser of a disinfectant. A disposable paper mat is positioned on the trap door arrangement.

Patented Aug. 24, 1971

INVENTOR
FLORAINE COHEN

BY Roberts & Cohen
ATTORNEYS

Patented Aug. 24, 1971

INVENTOR.
FLORAINE COHEN

BY
Roberts & Cohen
ATTORNEYS 3,601,093

PET ACCESSORY FOR ATTACHEMENT TO A COMMODE

PRIOR ART

There are a wide variety of toilet accessories for household pets available in the prior art. One such device is that disclosed in U.S. Pat. No. 2, 883,963 (V. L. Scott The Scott device provided for flushing with water and provided discharge openings through which liquid wastes may readily pass. The Scott device, however, involves a unit separate from a commode and requires a cleaning operation which is inconvenient and unsanitary.

Another known device is that disclosed in U.S. Pat. No. 2,464,580 (A. Johnson. The Johnson device is separate from any standard commode which might be available in the facility and, moreover, requires special plumbing arrangements for installation. Furthermore, the discharge of solid wastes is not efficiently provided for and the arrangement is not particularly convenient for animal use.

There is disclosed in U.S. Pat. No. 2,584,656 (C. H. Anderson a toilet accessory for household pets. The Anderson device consists of an attachment for use in connection with a standard commode and to this extend avoids some of the inconveniences noted hereinabove wit respect to the Scott and Johnson devices. The Anderson patent, however, does not conveniently provide for the disposal of solid wastes and, moreover, provides a limited area for such discharge in a manner which is not totally suitable for animal use. Moreover, the Anderson device fails to provide for thoroughly sanitary conditions in that there is no convenient arrangement for discharge and cleaning.

SUMMARY OF INVENTION

It is an object of the invention to provide an improved accessory for household pets constituting an improved toilet facility.

Ut us another object of the invention to provide a toilet accessory for household pets which enable sanitary conditions to be maintained by providing for convenient cleaning and discharge of both solid and liquid waste materials.

Another object is to provide an accessory of the aforenoted type which requires no special plumbing connections.

Yet another object of the invention is to provide an improved training device for pets.

Still another object of the invention is to provide for convenient means to retain pets in the facilities provided.

In achieving the above and other of the objects of the invention, there is provided in accordance with a preferred embodiment thereof an accessory which is adapted for being mounted on a commode ad which comprises a support and means for detachably holding the support on the commode and preventing horizontal displacement with respect thereto. Moreover, there is provided a trap door arrangement positioned by said support above the commode and adapted to discharge into the latter.

In accordance with a preferred usage of the invention, the trap door is employed to support a disposalbe paper mat or the like which can be treated with a odorant attractive to pets. The waste material is deposited on such mat which is then subsequently discharged into the commode by suitable operation of the trap door arrangement.

In accordance with another aspect of the invention, the support is an oval member conformed to and resting on the commode and provided with an interior channel having radially disposed ports through which water is discharged for purposes of cleaning and flushing the trap door arrangement.

According to still a further aspect of the invention there is provided a detachable and collapsible cage on the support wit a door therein so that the animal involved can be retained within the facility for purposes of training procedures.

The above and further objects and features of the invention will be apparent from the detailed description which follows hereinafter.

DRAWING

DETAILED DESCRIPTION

Figure 1:
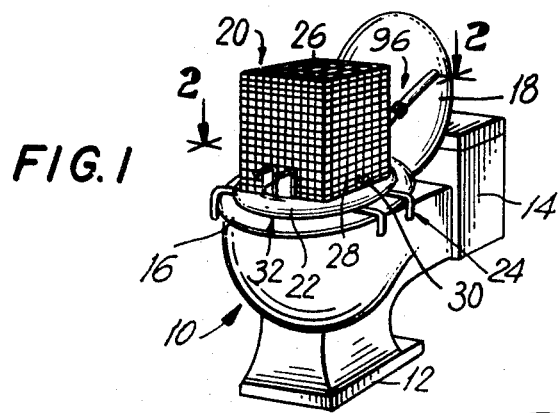
FIG. 1 is a perspective view of a standard commode on which is mounted a toilet accessory provided in accordance with the instant invention

In FIG. 1 appears a standard commode 10 including a base 12 and a tank 14 and also conventionally including a hinged seat 16 and a hinged cover 18. For attachment of the accessory of the invention, the cover 18 is pivoted into vertical attitude whereas the seat 16 is retained in horizontal attitude.

The accessory of the invention is generally indicated at 20 and includes a support 22 retained by hooks 24 (which can be as long as desired) in position on the seat 14, the hooks 24 preventing a horizontal displacement of the accessory. The accessory can also be designed for being supported directly on the basin which would allow latitude for making the cage larger.

As also appears in FIG. 1, the accessory includes a collapsible and detachable cage 26 having a door 28 which can be opened by means of a knob 30. A handle arrangement 32 is also provided for a purpose which will become hereinafter apparent.

Figure 2:
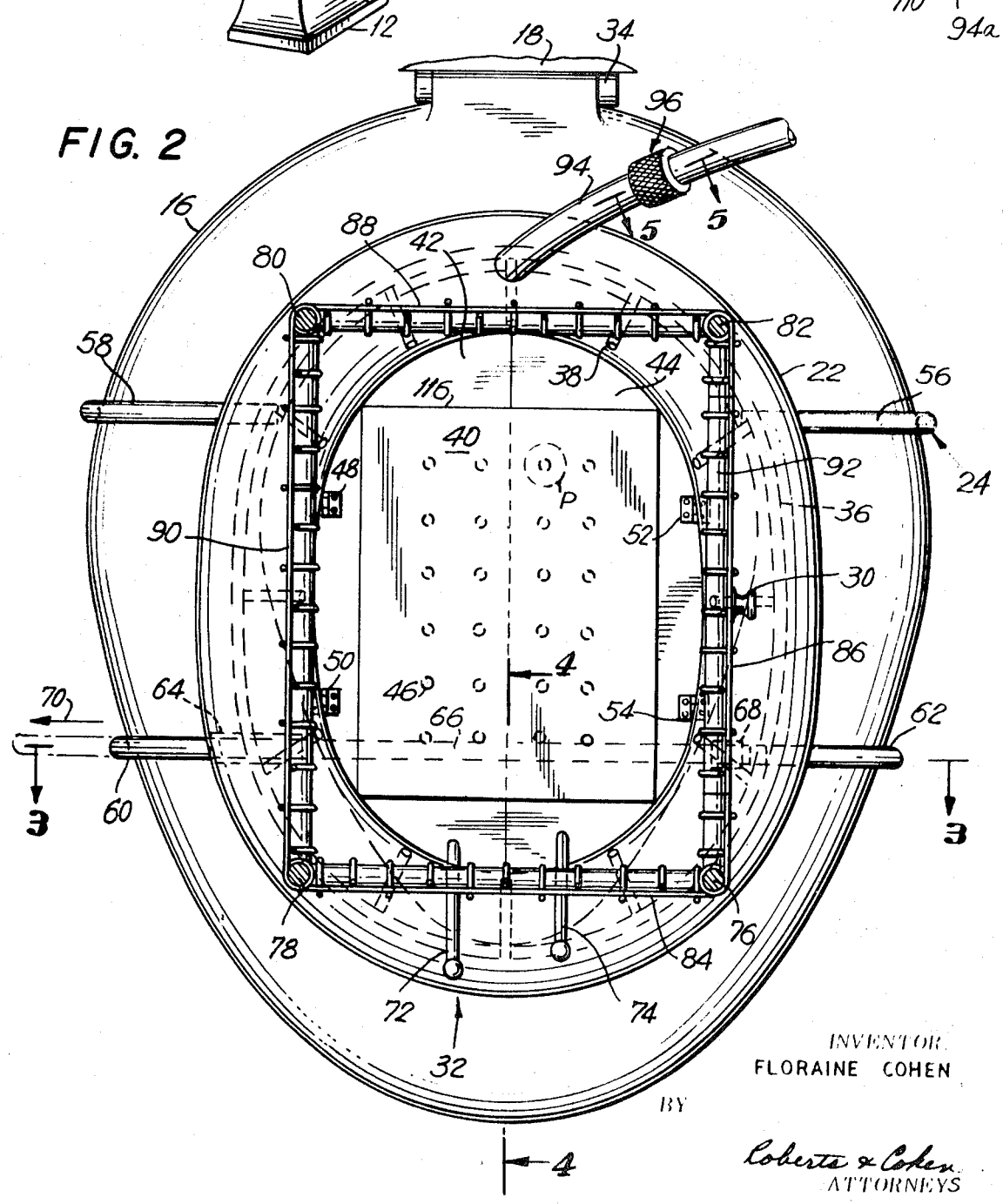
FIG. 2 is a cross-sectional view taken along line 2—2 of FIG. 1.
Figure 3:
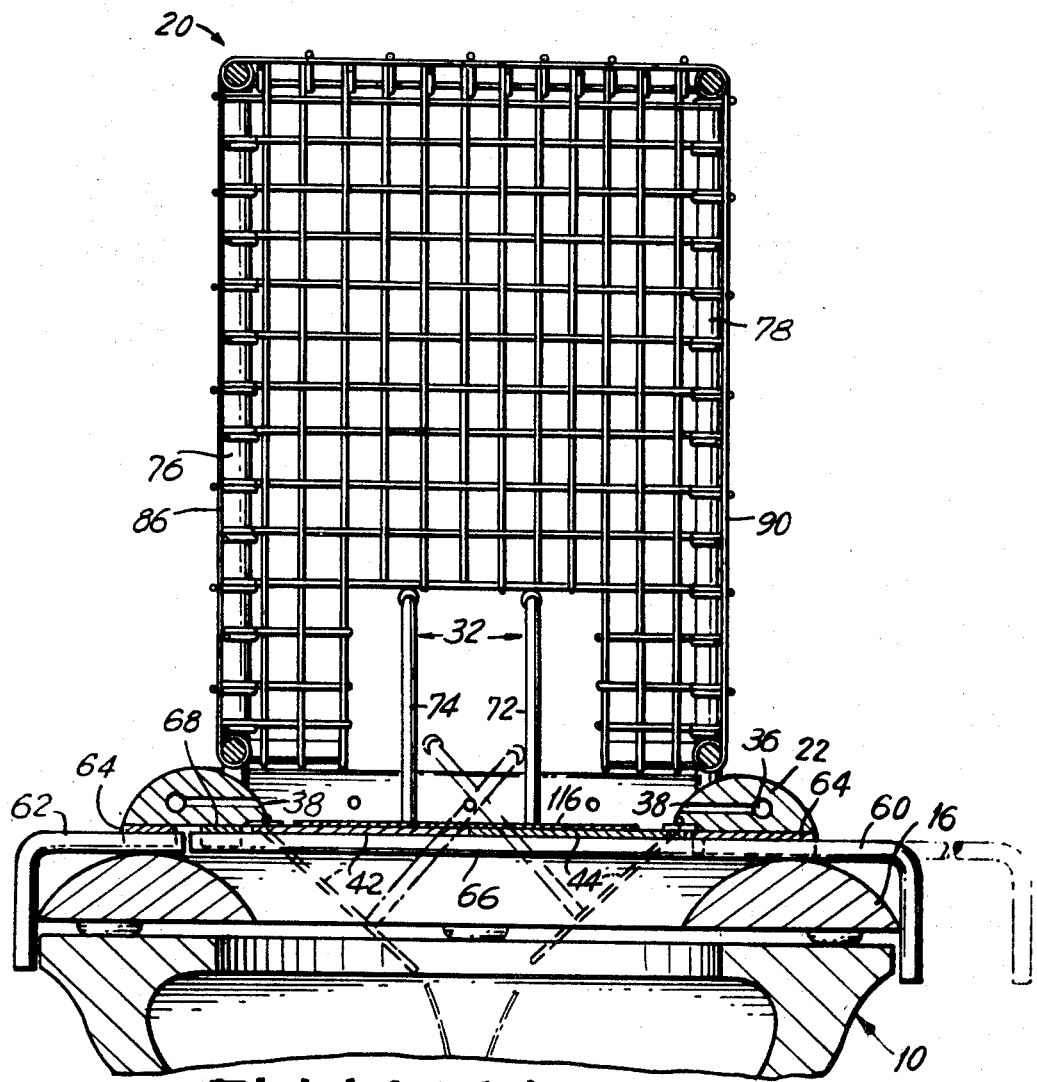
FIG. 3 is a cross-sectional view taken along line 3—3 of FIG. 2 with the bottom portion of the standard commode broken away.

As can be seen in FIGS. 2–3, the conventional seat 16 of the standard commode 10 is hinged at 34, the seat 16 being an oblong or oval structure of generally planar form in horizontal disposition.

The support 22 is also of generally planar form and horizontal attitude but is provided with a cross section which can be generally described as semicircular. The support 22 can also be described as being oblong or oval in shape.

An interior channel 36 is provided which extends completely through the support 22 and has opening therefrom ports 38 which open radially inwards from the said interior channel. The purpose of the interior channel and ports will be discussed hereinbelow.

The trap door arrangement is indicated generally at 40. It consists of two flaps 42 and 44 which are perforated as indicated at 46. Flap 42 is connected to the support 22 by means of spring-loaded hinges 48 and 50, whereas flap 44 is connected to support 22 by spring-loaded hinges 52 and 54.

Figure 4:
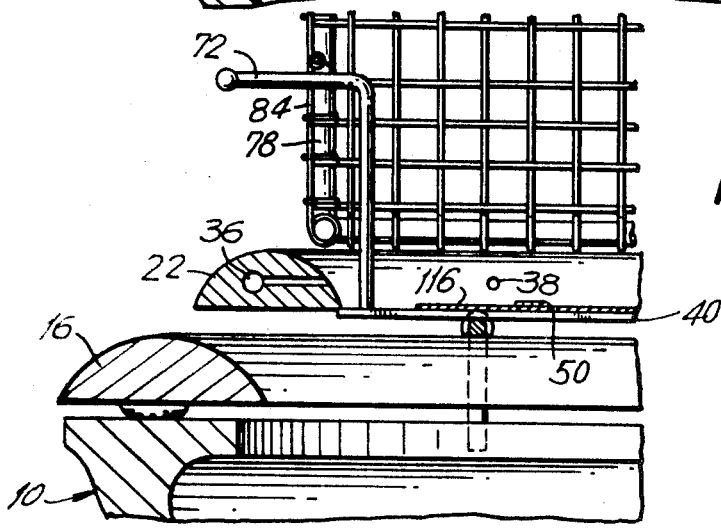
FIG. 4 is a cross-sectional view taken along line 4—4 of FIG. 2 with portions thereof broken away.

The hooks designated generally by the reference 24 in FIG. 1 are in FIGS. 2–4 indicated at 56, 58, 60 and 62. These hooks are connected to the support by bolts or suitable brackets or by any suitable means of adequate strength. The hook 60, however, performs a second function aside from retaining support 22 on the commode and for this reason is axially slidable in a bracket 64 in which it is mounted. To further aid the hook 60 in performing the second function which will be described hereinafter, the hook 60 includes integral therewith a rodlike extension 66 which extends across and below the trap door arrangement 40 and has one end thereof slidably accommodated in an eye bracket 68.

The spring-loaded hinges 48, 50, 52 and 54 are generally not adequate to support the weight of a pet thereupon. However, it will now appear that the rodlike extension 66 of the hook 60 in extending across and below the trap door arrangement 40 will prevent the trap door 40 from springing open under the weight of a pet resting upon the same. The trap door arrangement 40 is therefore able to open only when the hook 60 is withdrawn in the direction indicated by the arrow 70.

In order that the flaps 42 and 44 may be positively opened in downward direction, as indicated in phantom lines in FIG. 3, the handle arrangement 32 is provided as aforesaid. This arrangement includes handles 72 and 74 which as can best be seen in FIG. 2, are in staggered relationship in order that the handles may be moved across each other into the cross position illustrated in FIG. 3. This facilitates opening the trap door arrangement.

The support 22 is provided with four vertical blind bores in which are mounted posts 76, 78, 80 and 82 which are detachable. Wire meshes 84, 86, 88 and 90 have hooked ends which are guided onto the aforesaid posts in interdigitated relationships so that the sides and front and back of a detachable and collapsible cage will be constituted thereby. The aforenoted door 28 and knob 30 are provided in the side 86. The top of the cage is provided on horizontal rods 92 which are connected at their ends to the vertical posts by means of axially aligned bolts passing through diametral holes in the vertical posts, these holes and bolts being omitted from the drawing for purposes of simplification.

A flexible rubber hose 94 is provided which threads onto a nipple having hydraulic connection with the aforesaid interior channel 36. In said hose in installed a disinfectant-supplying element 96, the details of which appear in FIG. 5.

Figure 5:
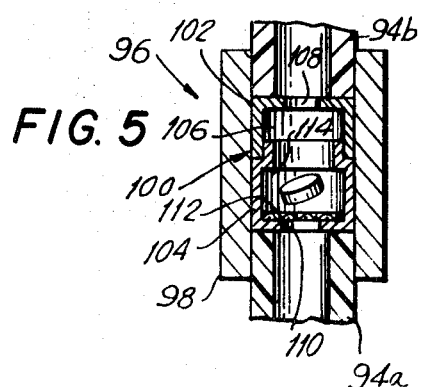
FIG. 5 is a sectional view taken along line 5—5 of FIG. 2 showing a detail of the invention.

In FIG. 5 are shown two sections 94a and 96b of the aforesaid flexible hose which are connected together by means of a collar 98. Between the two hose sections is provided a cage 100 made of interengaged sections 102 and 104 cooperatively defining an interior chamber 106 into which opens an inlet opening 108 and out of which opens an exit opening 110 covered by a screen 112. A disinfectant tablet 114 is provided in the chamber 106 and is gradually dissolved by water passing through the hose, the resulting solution passing into the interior channel 36 and being discharged through the ports 38.

A paper mat 116 rests upon the trap door arrangement 40. This mat can be of any absorbent paper or a suitable substitute material provided that the material is disposable by flushing through the commode 10. The mat 116 is preferably treated with an odorant suitable for attracting pets and including such pet to discharge its wastes thereupon.

For using the accessory of the invention, the cage is assembled on the support 22 which is thereupon mounted upon the seat 16 of the standard commode. The water supply to hose 94 is shut off so that the accessory at this point has no water flowing therethrough. The trap door arrangement is in its normal position of rest with the flaps up and in aligned horizontal attitude. The rodlike extension 66 of the hook 60 is extended across and beneath the trap door arrangement to be accommodated in the eyelike bracket 68. The door 28 of the cage is opened and the pet inserted into the cage. The pet is allowed to remain in the facility until the desired discharge takes place. Such discharge will be accommodated on the mat 116 whereafter the pet is moved from the cage.

Thereafter the hook 60 is withdrawn in the direction shown by arrow 70. The handles 72 and 74 are then operated to spring the trap door arrangement 40 open in a downward direction whereupon the mat 116 due to its own weight and that of the discharge thereon will be deposited downwardly into the commode 10. The water supply to the hose 94 may at any time during this operation be opened whereupon a cleansing action will be obtained by operation of the disinfectant-bearing water issuing from the ports 38.

Upon release of the handles 72 and 74, the flaps 42 and 44 will move upwardly under the action of the associated springs and the hook 60 is returned to its original position. The trap door arrangement 40 will then be held once again in horizontal position and the device will be ready for a subsequent use requiring only the installation of a replacement mat 116.

Also diagrammatically indicated in FIG. 2 is a vertical pole P having a lower reduced diameter threaded end which detachably engages into one of the holes 46 which is threaded for this purpose. The pole P is intended for the training of male dogs and can be removed if unnecessary.

What is claimed is:
1. A pet accessory adapted for being mounted on a commode, said pet accessory comprising a support, means for detachably holding the support on the commode and preventing horizontal displacement with respect thereto, and trap door means positioned by said support above the commode and adapted to discharge into the latter, said support being provided with a channel for the passage of water and ports opening from the channel onto said trap door means.

2. A pet accessory as claimed in claim 1, comprising a detachable and collapsible cage on said support.

3. A pet accessory as claimed in claim 1, comprising a disposable paper mat on said trap door means.

4. A pet accessory as claimed in claim 1, comprising a hose coupled to said channel and means in said hose to release a disinfectant into water passing through the hose.

5. A pet accessory adapted for being mounted on a commode, said pet accessory comprising a support, means for detachably holding the support on the commode and preventing horizontal displacement with respect thereto, and trap door means positioned by said support above the commode and adapted to discharge into the latter, said support being of oblong shape conforming generally to the commode and the first said means including hooks on the support for engaging the commode, one of the hooks being displaceable and extending under the trap door means to control the opening of the latter.

6. A pet accessory as claimed in claim 5, wherein the trap door means includes two flaps, hinge means coupling the flaps to said support, and handles on the flaps for manual operation of the same.

7. A pet accessory as claimed in claim 6, wherein the handles are staggered to permit crossing of the same on operation of the trap door means and the flaps are perforated.

8. A pet accessory adapted for being mounted on a commode, said pet accessory comprising a support, means for detachably holding the support on the commode and preventing horizontal displacement with respect thereto, and trap door means positioned by said support above the commode and adapted to discharge into the latter; said accessory further comprising a detachable and collapsible cage on said support.